Nov. 23, 1965   H. SIPLER   3,219,930
CLAMP-ON TYPE HALL-GENERATOR MEASURING DEVICE
Filed Oct. 19, 1961   2 Sheets-Sheet 1
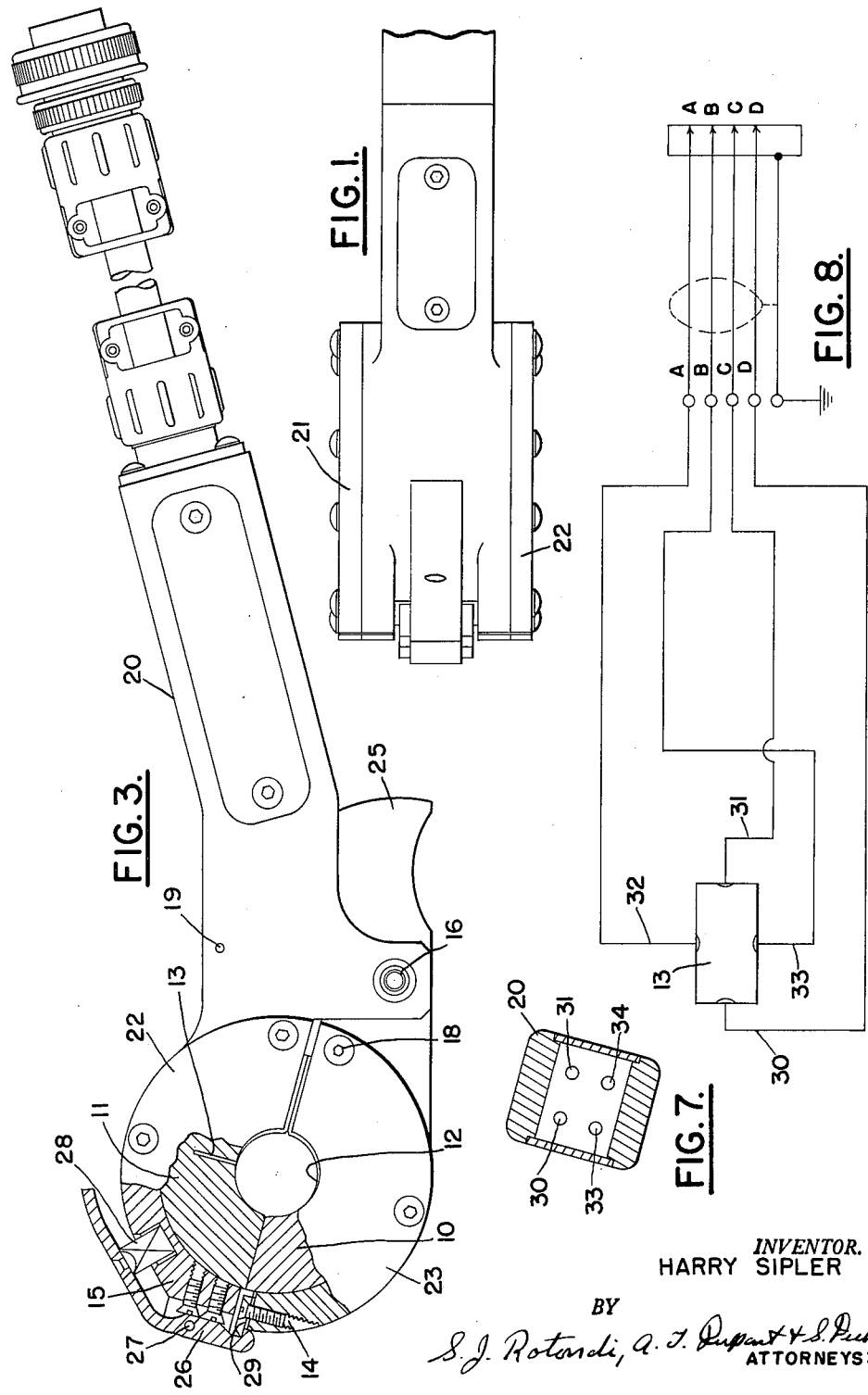
INVENTOR.
HARRY SIPLER
BY
S.J. Rotondi, A.T. Dupant + S. Pichoff
ATTORNEYS:

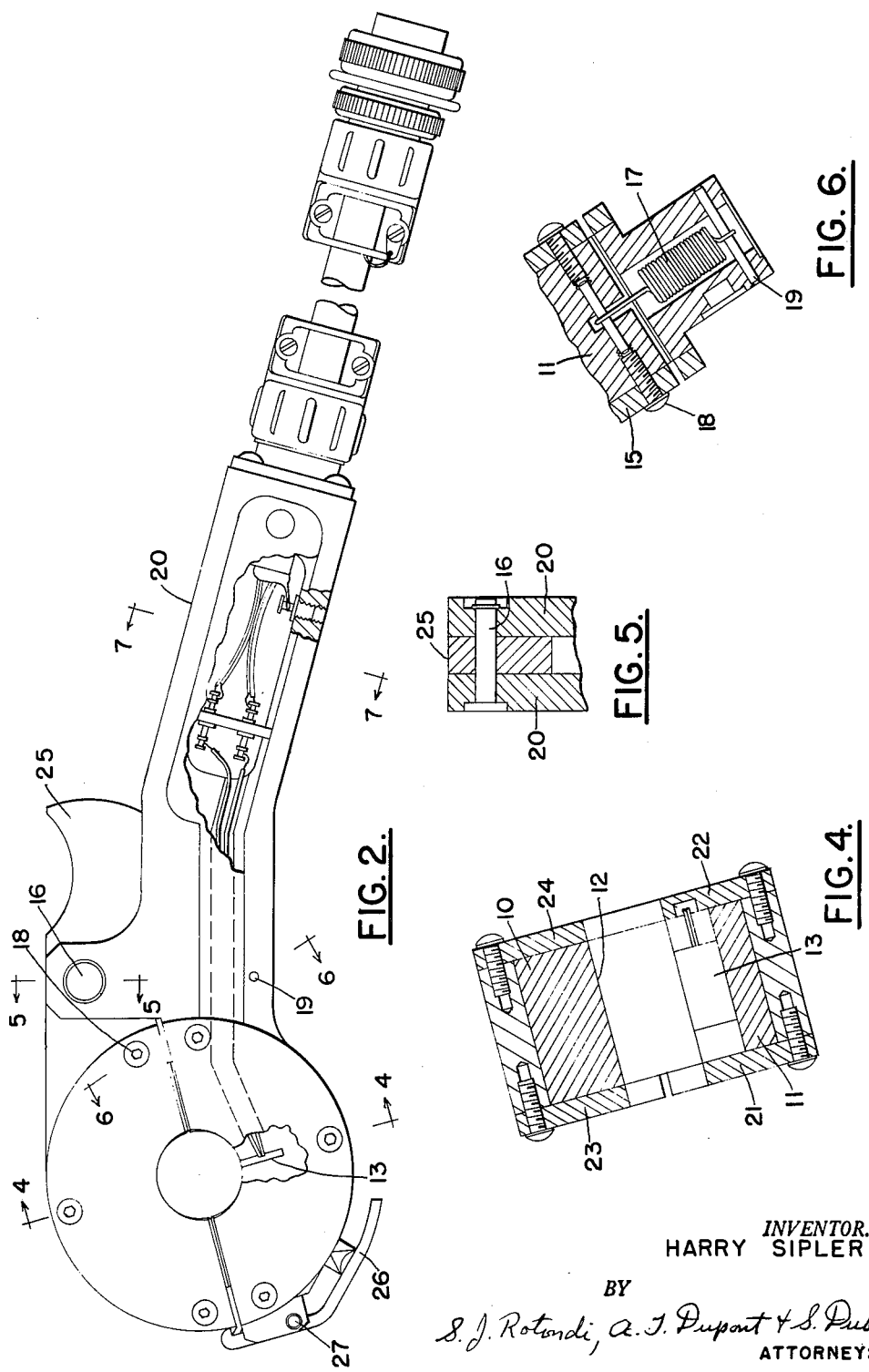

United States Patent Office 3,219,930
Patented Nov. 23, 1965

1

3,219,930
CLAMP-ON TYPE HALL-GENERATOR
MEASURING DEVICE
Harry Sipler, Philadelphia, Pa., assignor to the United
States of America as represented by the Secretary of
the Army
Filed Oct. 19, 1961, Ser. No. 146,382
1 Claim. (Cl. 324—117)
(Granted under Title 35, U.S. Code (1952), sec. 266)

The invention described herein may be manufactured and used by or for the Government for governmental purposes without the payment to me of any royalty thereon.

This invention relates to devices for measuring electric current, and more especially to a device suitable for measuring the current flowing in an insulated wire or cable without disconnecting the cable or making electrical contact with the conductor.

In automatic checkout systems for combat vehicles and similar devices, it is desirable that the electric power system of the tested device be diagnosed without disturbing the connections of the system. The reason for this is that a possible malfunction, such as a high resistance in a low tension circuit, might be missed if the circuit is interrupted. In addition, the transduced data has to be conveyed to a digital computer located at some distance from the tested device.

Heretofore, devices such as current transformers and "tong-tester meters" have been utilized to sense the current flowing in a conductor. Current transformers have the disadvantage that they are bulky and are insensitive to currents under 50 amperes. Tong-tester meters operate by means of an iron vane moving within an armature which is clamped around the tested cable. These meters measure currents of 30 to 1000 amperes but have the disadvantage that the reading must be viewed at the point of application. For this reason, they are not applicable to a checkout system wherein the various readings have to be conveyed to a computer located at some distance from the tested device.

The present invention avoids the above-mentioned difficulties by the provision of a current measuring device which is readily applied to the tested conductor, is readily utilized to transmit the transducer data to a point remote from the tested conductor, and is operable to measure a wide range of currents.

The invention will be better understood from the following description when considered in connection with the accompanying drawings and its scope is indicated by the appended claim.

Referring to the drawings:
FIG. 1 is a top view of the current measuring device,
FIG. 2 is a view of one side of the device, certain parts being cut away to reveal the location of a Hall effect generator and the wiring connected thereto,
FIG. 3 is a view of the other side of the device, certain parts being cut away to show the details of a catch whereby two hinged parts of the device are locked together,
FIG. 4 is a section taken on the line 4—4 of FIG. 2,
FIG. 5 is a section taken on the line 5—5 of FIG. 2,
FIG. 6 is a section taken on the line 6—6 of FIG. 2,
FIG. 7 is a section taken on the line 7—7 of FIG. 2, and
FIG. 8 is a wiring diagram of the Hall generator which is the sensing element of the device.

As seen most clearly in FIG. 3, the current measuring device includes two members 10 and 11 which are semicircular in shape and form an opening 12 when their ends are brought together as illustrated. The members 10 and 11 consist of a high permeability ferrite such as that designated by the term MN-30 in a pamphlet entitled

2

"Ferrites" and published by Kearfoot Company, Inc., Little Falls, N.J. Mounted within the member 11 is a Hall type generator 13 which is of the indium arsenide type and is hereinafter considered in greater detail.

The high permeability members 10 and 11 are fixed to supports 14 and 15 which are hinged together by a bolt 16 and are biased by a spring 17 (FIG. 6) to a position such that the ends of the members 10 and 11 are engaged as shown in FIG. 3. The spring 17 extends between pins 18 and 19, pin 19 being fixed in a handle 20 which is integral with the support 15 and pin 18 being one of the bolts by which the end members 21 and 22 (FIGS. 1 and 4) are clamped to the supports 14 and 15. The support 14 has a trigger 25 which may be compressed to separate the members 10 and 11 against the biasing force exerted by the spring 17. This permits ready attachment of the device to the cable or conductor to be tested which is received in the opening 12.

Where the device is utilized in the presence of vibrations, such as are encountered in the operation of a combat vehicle, it is desirable that the members 10 and 11 be locked together during the test. A suitable means for accomplishing this is the latch 26 which is pivoted on a pin 27 and is biased by a spring 28 into engagement with a striker plate 29.

As seen in FIG. 2, the handle 20 functions as the wire terminal box for the connections of the Hall generator. These connections are indicated by FIG. 8. They include leads 30 and 31 through which a small bias current is supplied and leads 32 and 33 between which there appears a voltage proportional to the density of any magnetic field applied to the face of the Hall generator 13.

In the use of the device, the ferrite members 10 and 11 are positioned as indicated in FIG. 3 with the tested cable in the opening 12. Under these conditions, the magnetic field produced by the current flowing in the conductor impinges on the face of the Hall generator 13 and there appears at the leads 32–33 a voltage which is proportional to the current in the conductor. This voltage is applied through leads 32–33 to a distant meter or readout device which is calibrated in terms of the current detected. The effect of a meter "scale factor" may be obtained by adjusting the value of the bias current transmitted through the leads 30–31.

In general, any magnetoresistive substance may be made to function as a Hall generator. The use of such a device as an accurate meter of a high order repeatability, however, requires exceptional stability. The indium arsenide type of Hall generator was selected for this reason. The particular type found most satisfactory was manufactured by the Siemens-Halske Co. of Munich, Germany, and has the type designation FA-24.

I claim:
A clamp-on type Hall-generator device for measuring electric current flow in a conductor, comprising in combination,
an elongated handle providing a terminal box for Hall-generator connections to extend therethrough,
a first semi-annular ferrite member having a first outer support element fixed to said handle,
a second semi-annular ferrite member having a second outer support element pivotally connected with said first support element and movable therewith into complementary engagement with the first ferrite member to form an annular ferrite ring with an axial opening therethrough for receiving a test conductor and with said support elements located circumferentially surrounding the semi-annular ferrite members,
a Hall-generator unit located in a slot cut into the first ferrite member, said slot lying in a plane extending radially from said axial opening and with one of its longer edges extending parallel with and adjacent to said opening, means exerting a resilient biasing force on said support elements whereby said second ferrite member is urged into engagement with the first ferrite member to maintain a closed magnetic circuit through said ring and about said opening and a test conductor therein, a trigger connected with said second outer support element and operable by a hand gripping said handle to move said element and separate said ferrite members against said force for insertion and removal of said conductor, and means providing electrical connections for current input and voltage output leads from said Hall-generator outwardly through said terminal box and handle.

References Cited by the Examiner
UNITED STATES PATENTS

| 2,198,371 | 4/1940 | Wolferz | 324—127 |
| 2,707,769 | 5/1955 | Shaper | 324—45 |
| 2,709,800 | 5/1955 | Temple | 324—127 |
| 2,886,779 | 5/1959 | Kuhrt | 324—127 |
| 2,901,705 | 8/1959 | Lamb | 324—127 |

FOREIGN PATENTS 957,527  2/1957  Germany.

OTHER REFERENCES

Clamp Type A.C. Microammeter, 2/60, Radio-Electronics, page 39.

FREDERICK M. STRADER, *Primary Examiner.*

WALTER L. CARLSON, *Examiner.*